(12) United States Patent
Bernard

(10) Patent No.: US 6,257,805 B1
(45) Date of Patent: Jul. 10, 2001

(54) SWITCHING DEVICE FOR CONVEYOR SYSTEM INSTALLATION

(75) Inventor: Frédéric Bernard, Villeneuve d'Ascq (FR)

(73) Assignee: Sidel Societe Anonyme, Octeville sur Mer (FR)

( * ) Notice: Subject to any disclaimer, the term of this patent is extended or adjusted under 35 U.S.C. 154(b) by 0 days.

(21) Appl. No.: 09/402,718

(22) PCT Filed: Apr. 8, 1998

(86) PCT No.: PCT/FR98/00716

§ 371 Date: Nov. 5, 1999

§ 102(e) Date: Nov. 5, 1999

(87) PCT Pub. No.: WO98/45196

PCT Pub. Date: Oct. 15, 1998

(30) Foreign Application Priority Data

Apr. 8, 1997 (FR) .................................................. 97 04514

(51) Int. Cl.⁷ .................................................. B65G 51/24
(52) U.S. Cl. .............................. 406/182; 406/87; 198/442; 193/31 A

(58) Field of Search ...................................... 198/442, 456, 198/631.1, 1, 2, 3, 181, 182, 86, 890.1; 406/87; 193/31 R, 31 A

(56) References Cited

U.S. PATENT DOCUMENTS 5,100,265    3/1992    Mirkin .

Primary Examiner—Christopher P. Ellis
Assistant Examiner—Joe Dillon, Jr.
(74) Attorney, Agent, or Firm—Harrison & Egbert

(57) ABSTRACT

A route switching apparatus for conveying articles, including a plurality of lines suitable for conveying the articles along respective separate paths and a body having a polygonal cross-section and pivotable about a longitudinal axis. The body is positioned along the plurality of lines between an entry and an exit of the lines. The body has a plurality of lateral faces with transfer lines formed on respective lateral faces. The transfer lines communicate with respective lines of the plurality of lines between the entry and the exit. The body is pivotable such that the transfer lines can communicate with different respective lines so that the articles moving along one of the separate paths can transfer to another of the separate paths.

8 Claims, 2 Drawing Sheets

SWITCHING DEVICE FOR CONVEYOR SYSTEM INSTALLATION

TECHNICAL FIELD

The present invention relates to a route switching device for an installation for conveying articles such as, in particular, bottles, flasks or the like, as well as to an air jet conveying installation equipped with such a device.

BACKGROUND ART

In the field of air jet bottle conveying, one frequently encounters installations having several conveying lines operating in parallel. In this case, it is generally necessary to be able to transfer the bottles from one conveying line to another.

For this purpose, there are several known route switching devices such as, in particular, Y type route switching means. These make it possible either to pass onto one of the lines without any change in direction or to transfer from the other line to the line.

Although they are satisfactory in certain simple configurations, they do not enable all eventualities to be covered.

Thus, in the case of an installation having two parallel conveying lines between which it is wished to be able to transfer bottles both in one direction and in the other at certain times, use has to be made of four Y type route switching devices mounted in series and head to tail.

To avoid such a complicated arrangement, there have already been developed route switching devices capable of performing all of these functions without having to be duplicated. These can involve, for example, route switching using a turntable provided with transfer lines, at right angles to the axis of rotation to the said turntable and capable of corresponding, according to the different alternative possibilities, to the conveying lines at the entry and the exit of the route switching system.

However, one drawback of such devices is that it necessitates an change of direction of the said conveying lines upstream and downstream of the turntable, even if it is wished that the bottles should cross the route switching system without changing lines.

Now, such a change in path leads to reductions in operating speeds and/or increases the risk of damage to the bottles transported.

Another drawback of turntable type route switching devices is that they are not optimal if they have to be used in installations comprising three or more conveying lines in parallel. They then offer only a limited number of solutions for transfer from one line to another and, once again, necessitate duplication.

The object of the present invention is to provided a route switching device that makes it possible to overcome the aforementioned drawbacks and that does not involve any change in path orientation when the articles conveyed have to pass through the device without changing conveying lines.

A further object of the present invention is to provide a route switching device that makes it possible to increase the number of possible combinations for transferring the articles conveyed from one conveying line to another.

Further objects and advantages of the present invention will emerge in the course of the following description, which is given only by way of illustration and is not intended to limit same.

SUMMARY OF THE INVENTION

The present invention relates to a route switching device for an installation for conveying articles such as, in particular, bottles, flasks or the like, including, at least partially, several lines for conveying the articles, the route switching device, which is designed to be placed in the path of the articles, being capable of ensuring their transfer, between the entry and the exit of the device, from at least one of the conveying lines to another and/or their passage without changing conveying lines, characterized by the fact that it is constituted by a body of polygonal cross-section, capable of pivoting about its longitudinal axis in such a way as to permit the alternate positioning of each of its lateral faces in the continuation of the lines conveying lines, each of the lateral faces being provided with at least one transfer line orientated according to one of the alternate possibilities for route switching the articles.

The present invention also relates to an installation for the air jet conveying of articles such as, in particular, bottles, flasks or the like, equipped with a route switching device as described above.

BRIEF DESCRIPTION OF THE DRAWINGS

The invention will be more clearly understood in the light of the following description, accompanied by the annexed drawings, which form an integral part thereof and wherein.

DETAILED DESCRIPTION OF THE INVENTION

The present invention relates to a route switching device for an installation for conveying articles such as, in particular, bottles, flasks or the like.

Figure 1:
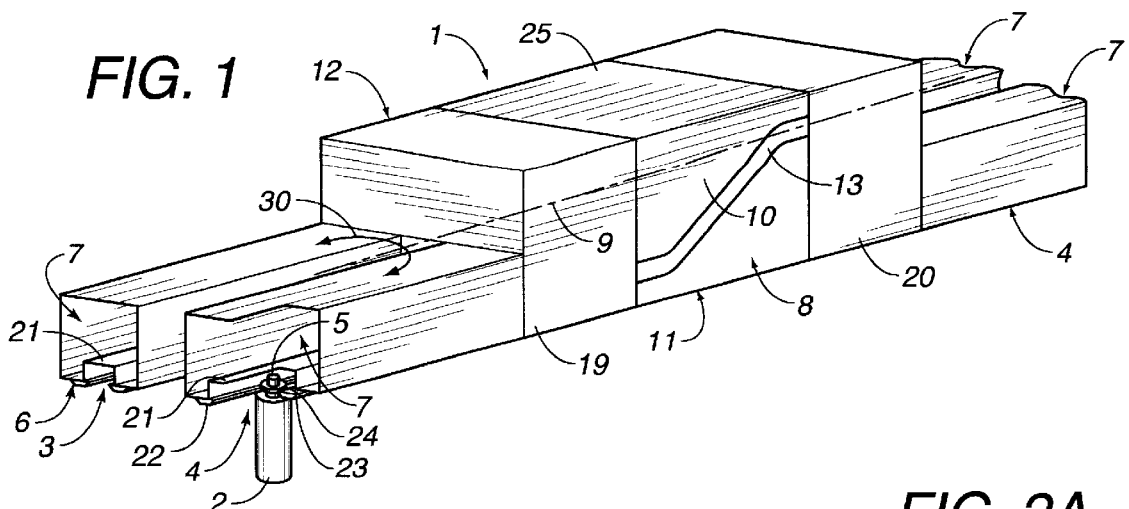
FIG. 1 is a perspective view of an exemplary form of embodiment of the route switching device according to the invention, equipping an exemplary conveying installation in which it can be used.

As shown in FIG. 1, route switching device 1 according to the invention is designed to be placed in the path of articles 2 that it is wished to convey, with the corresponding installation including, at least partially, several conveying lines, 3, 4.

As described in more detail hereinafter, the systems concerned are air jet conveying installations designed, for articles 2 provided with necks, 5. In such installations, the conveying lines 3, 4 include, in particular, support rails 6 capable of co-operating with the articles 2 in the area of the necks 5, and blowing chambers, 7, capable of enabling a stream of air to be projected onto the articles 2 so as to propel them.

The route switching device 1 permits the transfer, between its entry and its exit, of the articles 2 at least from one of the conveying lines to another and/or their passage without changing conveying lines.

It can thus be used, like conventional Y type route switching devices, with two conveying lines at the entry and one at the exit, or vice versa. Because of its structure, it can also be used with several conveying lines at a time at the entry and at the exit. The term several is, of course, to be taken as meaning at least two.

For this purpose, according to the invention, it is constituted by a body, 8, of polygonal cross-section, capable of pivoting about its longitudinal axis, 9, so as to permit the alternate positioning of each of its lateral faces, 10, 11, 12, in the continuation of the conveying lines 3, 4. The body 8 is thus prism shaped, each of its lateral faces 10, 11, 12 being further provided with at least one transfer line 13; 14, 15; 16 orientated according to one of the alternate route switching possibilities for the articles 2.

The expression alternate route switching possibility is to be taken as meaning that the lateral faces each have, at least certain of them, 10, 11, 12, one or more transfer lines permitting one of orientations desired for articles 2, namely either passage without changing conveying lines, this being applicable to all of the conveying lines, or transfer from one conveying line to another in the case of one or more of the conveying lines, the paths of articles 2 conveyed over the other lines, if any, remaining unchanged.

It will thus be noted, with each face performing a specific function, that the paths of articles 2 can be optimized in each of the alternate possibilities. In particular, when passing through without changing lines, route switching device 1 can be crossed rectilinearly, which makes it possible to avoid breaks in rhythm.

According to the particular form of embodiment shown, body 8 has four lateral faces. However, any prism shape with at least three plane lateral faces could also be used.

Figure 2A:
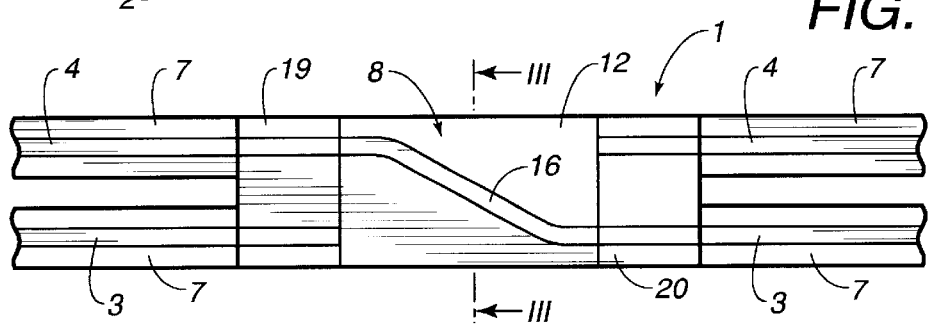
FIGS. 2a to 2c are bottom views showing the configuration of different faces of the body constituting the route switching device shown in FIG. 1.
Figure 2B:
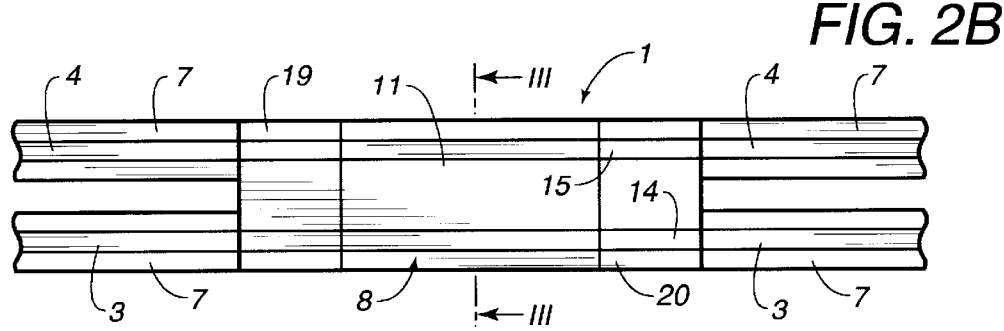
Figure 2C:
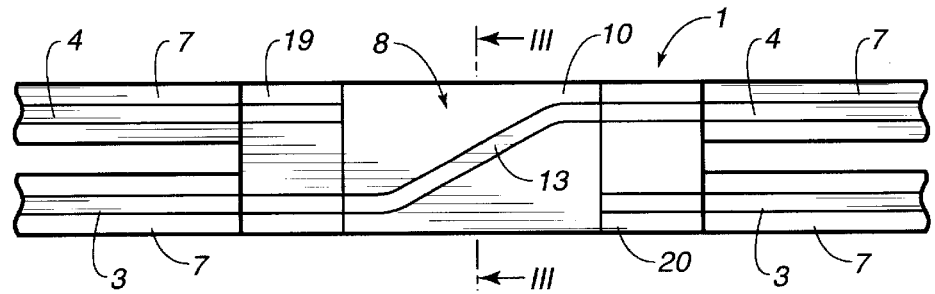

Referring now to FIGS. 2a to 2c, it will be noted that, on faces 10, 12 permitting passage from one conveying line 3, 4 to another, transfer lines 13, 16 can form slightly rounded angles in the area of the changes in direction. In the case of faces 11 permitting passage without conveying line transfer, transfer lines 4, 15 are, for example, as mentioned earlier, in the rectilinear continuation of the conveying lines 3, 4.

The faces 10, 12 permitting a change in conveying lines can also have two transfer lines, which are then of a Y type design, so as to further permit passage without a change of lines for one of conveying lines 3, 4.

The longitudinal axis, 9, of the body 8 is, in particular, intended to be orientated so as to be substantially parallel to conveying lines 3, 4 and, as illustrated in FIG. 1, is located above the latter, that is to say on the side opposite the path of articles 2.

Each lateral face 10, 11, 12 has, a dimension exceeding the center to center distance provided between conveying lines 3, 4 at the entry to and/or exit from the route switching device 1.

According to the particular exemplary form of embodiment shown, the body 8 has a substantially square cross-section, with a first one, 11, of its lateral faces permitting passage without a change in conveying lines, a second one, 12, permitting passage from one of conveying lines, 4, termed the 'right-hand lane', to the other conveying line, 3, termed the 'left-hand lane', and a third one, 10, permitting passage from the so-called left hand lane 3 to the so-called right-hand lane 4.

As mentioned earlier, the body 8 can also have a triangular cross-section, all of the route switching possibilities then being obtained in the case of an installation including, as shown, two conveying lines 3, 4 at the entry to and exit from the device 1. However, a quadrangular cross section has the advantage of offering an additional face that can be equipped according to the structure of the installation into which the route switching device 1 is incorporated.

With a square cross-section, by rotating the body 8 a quarter of a turn in the direction of arrow 30, the route switching option for articles 2 can be changed at will.

The first face 11 is located, for example, between the second and third faces 12, 10.

The first face, 11, has, in particular, two transfer lines, 14,15, which are parallel to one another. As to the second, 12, and third, 10, lateral faces, they each have a transfer line, 13, 16, connecting conveying lines 3, 4 concerned in a direction that is substantially parallel to the diagonal of corresponding lateral face 10, 12 of body 8.

Figure 3:
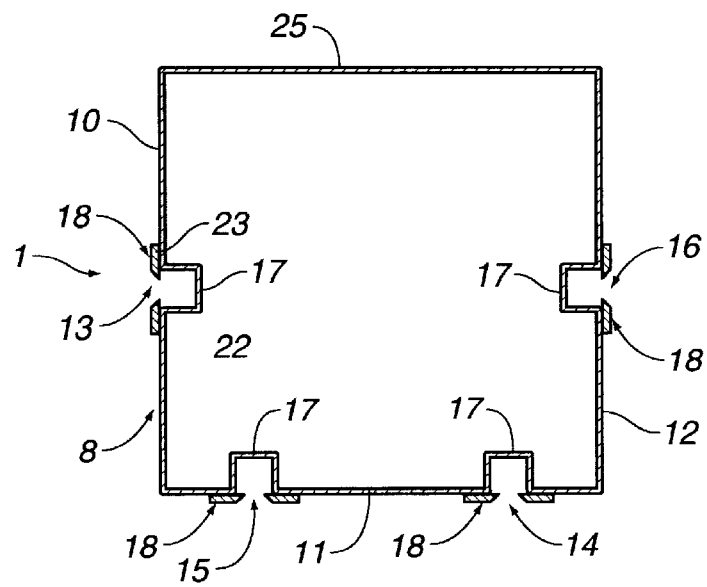
FIG. 3 is a schematic cross-sectional view along line III—III of FIGS. 2a to 2c above.
Figure 4A:
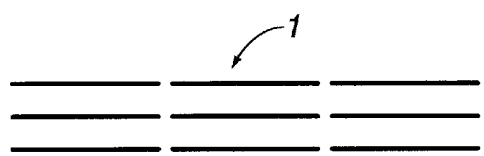
FIGS. 4a to 4e are diagrams illustrating the configuration of the different faces of a body constituting another exemplary form of embodiment of the route switching device according to the invention.
Figure 4B:
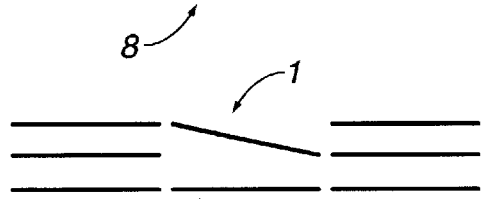
Figure 4C:
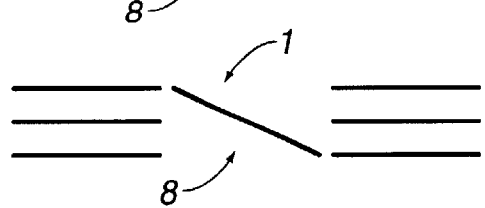
Figure 4D:
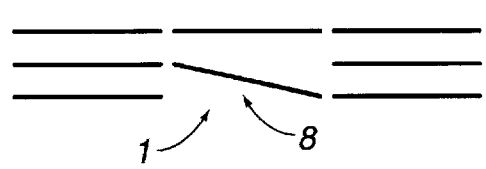
Figure 4E:
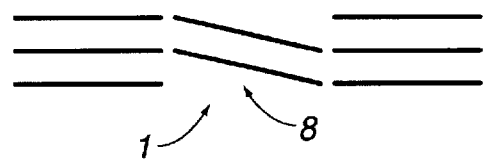

Referring now to FIG. 3, it will be noted that each transfer line 13; 14; 15; 16 is constituted, for-example, by a channel, 17, capable of receiving one end, 5, of the articles 2, and by a support rail, 18, provided under the channel 17, capable of co-operating with the end 5.

The route switching device 1 further, possibly, includes at least in the area of the transfer lines 13; 14; 15; 16, lateral guides, not shown. The function of the latter is, in particular, to improve the guiding of the articles conveyed. If used, they give the body 8 the appearance, as it were, of a hedgehog.

Referring again to FIG. 1, it will be noted that, according to the particular exemplary form of embodiment shown, the route switching device 1 includes, upstream and downstream of the body 8, a travel chamber, 19, 20, capable of facilitating interfacing between the body 8 and the conveying lines 3, 4, particularly as a function of the structure of the installation used.

The travel chambers 19, 20 and the body 8 are, of the same cross-section and/or in the continuation of one another when the body 8 is in position, the travel chambers 19, 20 being designed to be fixed, that is to say, unlike the body 8, not turning.

The travel chambers 19, 20, are, of course, equipped with lines for conveying articles 2, in particular in the rectilinear continuation of the conveying lines 3, 4 of the installation into which the device 1 is incorporated. As in the case of transfer lines 13; 14; 15; 16, they have, a structure formed by a channel and a support rail.

The travel chambers 19, 20 can further, if applicable, also be provided with lateral guides for articles 2.

This being the case, the route switching device 1 is provided, with an electric motor, not shown, capable of driving the body 8 in rotation.

With reference to FIGS. 4a to 4e it will be noted, as mentioned earlier, that the route switching device according to the invention can also be provided with more than two conveying lines at the entry and at the exit. Here is illustrated an installation comprising three conveying line at the entry and at the exit.

In the case illustrated, body 8 includes, five lateral faces so as to enable all the possible options of route switching to the right to be used.

The invention also relates to an installation for the air jet conveying of articles 2 such as, in particular, bottles, flasks or the like, equipped with a route switching device 1 as presented above.

As shown in FIG. 1, and as mentioned earlier, the installation is, one including support rails 6, capable of co-operating with the articles 2 along its conveying lines 3, 4, and blowing chambers 7 capable of permitting a stream of air to be projected onto the articles 2 so as to propel them along the conveying lines 3, 4.

According to the particular exemplary form of embodiment illustrated, the blowing chambers 7 are disposed above the support rails 6. In addition, the blowing chambers 7 have channels 21 through which an end, 5, of the articles 2 can travel under the action of a jet of air arriving from the blowing chambers 7 through slits, not shown, provided on the walls of the channels 17. In this case, the support rails 6 are located under the channels 21 and are constituted, in particular, by two rail elements, 22, 23, located on either side of the corresponding channels 21.

Such installations can be used to convey articles 2 having, a protuberance, 24, in the area of their necks 5, the necks 5 travelling through the channel 21, and the protuberance 24 co-operating with the rail elements 22, 23.

This being the case, according to such an exemplary form of embodiment, support rails 6, 18 of the installation and of the route switching device 1 are provided in the continuation of one another, as well as the channels 21, 17. In addition, the channels 17 of the route switching device 1 are provided, as applicable, with slits enabling the jets of air to be propelled onto the articles 2, while the support rails 18 of the route switching device 1 are constituted by two rail elements provided on either side of the channels 17, both in the case of the body and, as applicable, in that of the travel chambers 19, 20.

Integration of the route switching device 1 into the air jet conveying installation described is thus optimized. In this connection, it should be noted that, in this case, the travel chambers 19, 20 are particularly useful. They in fact permit a tight junction between the blowing chambers 7 of conveying lines 3, 4 and the body 8. Articles 2 can thus be conveyed, at the time of route switching, with a minimum of air loss.

If a pressure increase in the body 8 were nonetheless required, a blower system, not shown, could be provided, on a free face, 25, of the body 8.

However, the face 25 can, according to another form of embodiment, have transfer lines, according to one of the possible route switching options, that may be redundant in relation to the options already existing on the other faces 10, 11, 12.

To further facilitate the conveying of articles 2, lateral guides, not shown, can also be provided along the conveying lines 3, 4 of the installation.

Other forms of embodiment of the present invention, within the grasp of a man of the art, could, of course, have been contemplated without thereby departing from the scope of the invention.

What is claimed is:

1. A route switching apparatus for conveying articles comprising:
   a plurality of lines suitable for conveying the articles along respective separate paths, each[] of said plurality of lines having an entry and an exit; and
   a body having a polygonal cross-section, body being pivotable about a longitudinal axis thereof, said body positioned along said plurality of lines between entry and exit, said body having a plurality of lateral faces, said body having transfer lines formed on respective lateral faces, said transfer lines communicating with respective lines of said plurality of lines, said body being pivotable such that said transfer lines can communicate with different respective lines of said plurality of lines such that the articles moving along one of said separate paths can transfer to another of said separate paths.

2. The apparatus of claim 1, said longitudinal axis of body being in parallel relationship to said plurality of lines.

3. The apparatus of claim 1, said longitudinal axis being positioned above said plurality of lines.

4. The apparatus of claim 1, each of said plurality of lateral faces having a dimension of a greater length than a length of a center-to-center distance between adjacent lines of said plurality of lines at either entry or said exit.

5. The apparatus of claim 1, each of said transfer lines comprising:
   a channel; and
   a supported rail affixed to said body and positioned outwardly of said channel.

6. The apparatus of claim 1, further comprising:
   a first travel chamber positioned between one side of said plurality of lines extending from said entry; and
   a second travel chamber positioned between an opposite side of said body and said plurality of lines extending toward said exit.

7. The apparatus of claim 1, said body having a substantially square cross-section, a first transfer line of said transfer lines communicating with one of said plurality of lines such that the articles can move along the path without a transfer to another path, a second transfer line of said transfer lines communicating with said plurality of lines such that the articles can move from one path to another path, and a third transfer line of said transfer lines communicating with said plurality of lines such that the articles can move from said another path to said one path.

8. The apparatus of claim 7, said body having a first lateral face having two transfer lines formed therein in parallel relationship and communicatable with two of said plurality of lines, said body having a second lateral face and a third lateral face each with single transfer lines connecting different lines of said plurality lines together in a direction substantially parallel to a diagonal across a respective lateral face of said second and third lateral faces.

* * * * *